May 5, 1925.
G. Y. CHAMBLISS
HEADLIGHT SHADE
Filed April 10, 1923
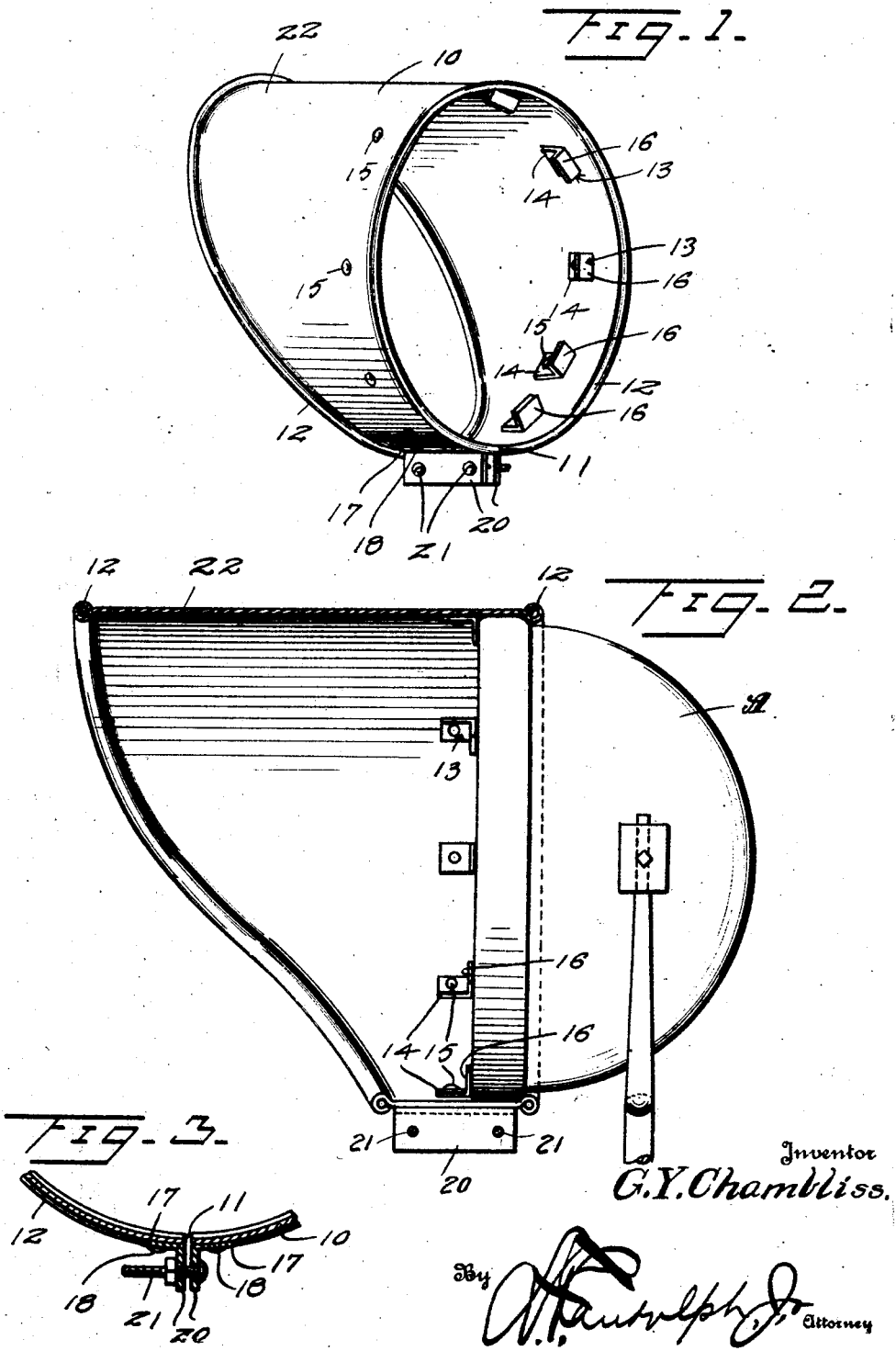
Inventor
G. Y. Chambliss.

Patented May 5, 1925.

1,536,770

UNITED STATES PATENT OFFICE.

GREEN Y. CHAMBLISS, OF EL PASO, TEXAS, ASSIGNOR OF ONE-THIRD TO MARY L. BLEVINS, OF ANTHONY, NEW MEXICO.

HEADLIGHT SHADE.

Application filed April 10, 1923. Serial No. 631,159.

*To all whom it may concern:*

Be it known that I, GREEN Y. CHAMBLISS, a citizen of the United States, residing at El Paso, in the county of El Paso and State of Texas, have invented certain new and useful Improvements in Headlight Shades; and I do hereby declare the following to be a full, clear, and exact description of the invention, such as will enable others skilled in the art to which it appertains to make and use the same.

This invention relates to a headlight shade.

It is aimed to provide a novel, simple and inexpensive shade adapted to be separably clamped to vehicle headlights so as to restrain the rays of light therefrom, maintaining them to the road and preventing their blinding pedestrians or drivers of approaching vehicles, and a construction which includes novel means to facilitate its positioning without affecting the flexure thereof.

Additional objects and advantages will become apparent from a consideration of the description following taken in connection with accompanying drawings illustrating an operative embodiment.

In said drawings:—

Figure 1 is a perspective view of the shade;

Figure 2 is a view showing the shade in substantially central longitudinal section and as applied to an automobile headlight; and Figure 3 is a detail sectional view illustrating the clamp by means of which the shade is secured in position upon a head light.

Like reference characters designate like or similar parts in each view.

In carrying out the invention, a shade 10 is provided consisting of a sheet metal or other tube, arranged with its longitudinal axis horizontal and being split as at 11 at the lower portion thereof. The rear edge of the shade is vertically disposed while the forward edge inclines or curves upwardly and forwardly. Both said rear edge and forward edge are beaded or marginally reinforced as at 12.

The shade is adapted to be placed about a headlight or the equivalent such as a conventional automobile headlight as suggested at A in Figure 2. The rear end of the shade extends but part way on to the headlight, being limited to the desired position by lugs 13 disposed in spaced relation and in suitable numbers about the interior of the shade. Lugs 13 may be of sheet metal and of L-shape having one arm 14 secured to the shade as by means of a rivet 15 and the other arm 16 projecting therefrom toward the center of the shade and adapted to directly abut the front of the headlight.

In the position mentioned and shown in Figure 2, the shade is adapted to be clamped in place. To this end, L-shaped plates 17 are riveted at 18 to the shade on opposite sides of the split 11. Plates 17 have vertical leaves 20 through which ordinary bolts 21 may be passed.

As the device is of sheet metal, it may be readily contracted or expanded to facilitate engaging the headlight or accommodating itself to headlights differing slightly in size. With the lugs 13 in engagement with the headlights and the bolts 21 securely fastened, the shade will be rigidly and detachably secured in place.

As the lugs 13 are separated and unconnected, they do not interfere with the flexure or adaptation of the shade to the headlight.

The shade provides an exceedingly long hood or portion at the top as at 22 which prevents radiation of the rays from the headlight in an upward direction, thus confining such rays to the ground. This avoids confusion and blinding of both pedestrians and occupants of approaching vehicles.

I claim as my invention:—

A shade for a headlight in combination with the relatively wide lens-retaining rim of the latter projecting outwardly of the margin of the headlight, the shade consisting of a substantially cylindrical metallic split body having its rear edge substantially vertical and at a right angle to its axis, plates secured to the body on opposite sides of the split, a bolt to draw said plates toward each other, said body being adapted to telescope the lens-retaining rim, lugs independent of each other in spaced relation fastened about the interior of the body and inwardly of said rear edge a distance corresponding to the width of the rim, said body at its rear edge having an inwardly extending bead, and said lugs with said bead being directly engageable with the opposite edges of the rim for the support of the shade.

In testimony whereof I affix my signature in presence of two witnesses.

GREEN Y. CHAMBLISS.

Witnesses:
W. C. DENTON,
H. L. McCUNE.